United States Patent Office 3,239,356
Patented Mar. 8, 1966

3,239,356
ESTROGENIC COMPOUNDS AND ANIMAL
GROWTH PROMOTERS
Edward B. Hodge, Phil H. Hidy, and Herbert L. Wehrmeister, Terre Haute, Ind., assignors to Commercial Solvents Corporation, a corporation of Maryland
No Drawing. Filed Feb. 15, 1965, Ser. No. 432,896
20 Claims. (Cl. 99—2)

The present invention relates to new compounds and an object of the present invention is to provide compounds which exhibit estrogenic activity or aid in increasing the rate of growth in meat-producing animals, e.g. cattle, lamb and swine.

A conventional formula for the compounds of the present invention is:

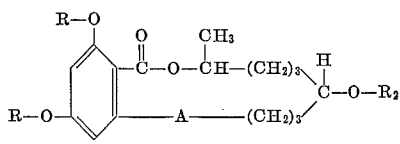

where A is the radical —CH=CH— or —CH$_2$—CH$_2$—; R is hydrogen, substituted or unsubstituted alkyl, e.g. lower alkyl such as methyl, ethyl, hexyl, etc., and the radical

wherein R$_1$ is unsubstituted or substituted lower alkyl, e.g. methyl, ethyl, hexyl, etc.; and R$_2$ is substituted or unsubstituted alkyl, e.g. lower alkyl such as methyl, ethyl, hexyl, etc., and the radical

wherein R$_1$ has the above meaning. Compounds having the above formula wherein R, R$_1$ and R$_2$ are substituted or unsubstituted aryl, e.g. phenyl and bromophenyl; and aralkyl, e.g. benzyl, are also contemplated by the present invention. There are two diastereoisomers of the compounds of the present invention.

The compounds can be administered to animals by any suitable method including oral and parenteral administrations. For example, the compound can be blended with ordinary feed containing nutritional values in an amount sufficient to produce the desired rate of growth and thus be fed directly to the animals, or the compound can be suspended in a suitable injection suspension medium such as peanut oil and injected parenterally. The amount of compound fed to an animal, of course, varies depending upon the animal, desired rate of growth and the like.

When the new compounds are to be administered in feeds, an animal feed composition may be prepared containing the usual nutritionally-balanced quantities of carbohydrates, proteins, vitamins and minerals, together with a compound of the present invention. Some of these usual dietary elements are grains, such as ground grain and grain by-products; animal protein substances, such as those found in fish meal and meat scraps; vegetable proteins like soybean oil meal or peanut oil meal; vitaminaceous materials, e.g. vitamin A and D mixtures; riboflavin supplements and other vitamin B complex members; and bone meal and limestone to provide minerals. A type of conventional feed material for use with cattle includes alfalfa hay and ground corn cobs together with supplementary vitaminaceous substances if desired.

The compounds of the present invention can be produced from the compound:

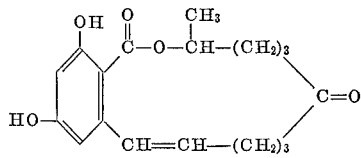

hereinafter referred to as the fermentation estrogenic substance (F.E.S.) by reducing the ketone group with hydrogen to an alcohol group, i.e.

and replacing the hydrogen atom on the hydroxyl group of the reduced ketone group with an acyl or alkyl radical using conventional acylation or alkylation procedures. When compounds having A as —CH$_2$—CH$_2$— are desired, the olefinic bond is reduced by adding two hydrogen atoms. Conventional alkylation and/or acylation procedures can be used to replace one or both of the hydrogen atoms of the OH groups on the benzene ring of F.E.S. with an acyl or alkyl radical. The reduction of the olefinic bond and the ketone group in the presence of hydrogen to add four hydrogen atoms can be accomplished using, for instance, hydrogen in the presence of a Raney nickel catalyst. The nomenclature used herein is based upon the F.E.S. compound. For example, the compound produced upon reduction of the ketone group to the structure

is referred to as F.E.S. alcohol and upon reduction of both the olefinic bond and the ketone group the compound is referred to as dihydro F.E.S. alcohol. Compounds of this invention where R and R$_2$ are alkyl are referred to as either trialkyl dihydro F.E.S. alcohol or trialkyl F.E.S. alcohol depending upon whether A is —CH$_2$—CH$_2$— or —CH=CH—.

The reduction of F.E.S. to produce dihydro F.E.S. alcohol is preferably carried out using Raney nickel catalyst with the F.E.S. suspended or dissolved in a suitable solvent, e.g. an alcohol, preferably a lower alkanol such as methanol, ethanol, etc. In general, the reduction can be accomplished at ambient temperatures and ambient pressures. Preferably temperatures are from about 15° to 40° C., and preferably pressures are of from about 1 to 100 atmospheres. In general from about 0.1 to 5 grams of catalyst are used per gram of F.E.S.

The selective reduction of the ketone group to avoid saturating the olefinic bond and thus produce compounds where A is —CH=CH— is preferably carried out with the F.E.S. suspended or dissolved in a suitable solvent, e.g. an alcohol, preferably, a lower alkanol such as methanol, ethanol, etc. using sodium borohydride. In general, the reduction can be accomplished at ambient pressures by heating the F.E.S. solution with sodium borohydride, and recovering the F.E.S. alcohol.

In producing compounds of the present invention where R is alkyl, conventional alkylation procedures can be used to replace the hydrogen atom of one or both of the hydroxyl groups on the benzene ring of F.E.S. with an alkyl radical. Trialkylated dihydro F.E.S. alcohol compounds can be produced, for example, by reducing F.E.S. to add four hydrogens as set forth supra to produce dihydro F.E.S. alcohol and then alkylating the three hydroxyl groups. The alkylation can be by reaction with the corresponding dialkyl sulfates, e.g. dimethyl sulfate, diethyl sulfate, etc. A monomethyl F.E.S. compound with the methyl group replacing the hydrogen of the hydroxyl group para to the ester group can be selectively produced using diazomethane and the hydrogens of the remaining hydroxyl groups can be replaced with an acyl or alkyl group.

Acylation of the F.E.S. compounds can be accomplished by reaction of F.E.S. with the corresponding acid anhydride, e.g. acetic anhydride, propionic anhydride, etc., catalyzed with sodium acetate or pyridine. Ambient conditions can be used although it is preferred to keep the reaction mixture cold. To prepare compounds wherein one of the R's is alkyl and the remaining R is acyl, F.E.S. is advantageously first alkylated and acylated. Alkylation or acylation at the position of the ketone group can be accomplished by first reducing the ketone group and then alkylating, etc.

The fermentation estrogenic substance (F.E.S.) is so named since a convenient method for producing it is by cultivating, on a suitable nutrient medium, the organism *Gibberella zeae* (Gordon) on deposit at the Northern Utilization Research and Development Division of the United States Department of Agriculture under the number NRRL–2830.

The following examples are offered to illustrate this invention; however, the invention is not limited to the specific materials, amounts, and procedures set forth. The first example illustrates preparation of a suitable inoculum containing the organism *Gibberella zeae* (Gordon) NRRL–2830.

EXAMPLE I

A spore sand culture containing *Gibberella zeae* (Gordon) NRRL–2830 was aseptically placed in a sterile tube containing 15 milliliters of Czapek's-Dox solution and a small amount of agar. This medium was then incubated for about 168 hours at approximately 25° C. At the end of the incubation period, the medium was washed with 5 milliliters of sterile deionized water and transferred to a sterile tube containing 45 milliliters of Czapek's-Dox solution. The contents of the tube were then incubated for about 96 hours at about 25° C. after which the material was available for use in inoculation of a fermentation medium.

The following example illustrates the fermentation of the organism *Gibberella zeae* (Gordon) NRRL–2830 to produce F.E.S.

EXAMPLE II

To a 2 liter flask were added 300 grams of finely divided corn. The flask and its contents were then sterilized and after sterilization 150 milliliters of sterile deionized water were added. To the mixture in the flask were then added 45 milliliters of the inoculum prepared by the process of Example I and the material was thoroughly mixed. The mixed material was then incubated for about 20 days at 25° C. in a dark room in a water-saturated atmosphere.

The following example illustrates the recovery of F.E.S. from the fermentation medium.

EXAMPLE III

A 300 gram portion of fermented material produced by the method of Example II was placed in 500 milliliters of deionized water and slurried. The slurry was then heated for about 15 minutes at 75° C., 300 grams of filter aid were then added and the material was filtered. The solid filtered material containing the anabolic substance was then air dried, and 333 grams of the dried cake were then extracted with 500 milliliters of ethanol. This procedure was repeated three more times. The ethanol extract was evaporated to dryness under vacuum to give 6.84 grams of solid material. This solid material was then dissolved in 20 milliliters of chloroform and extracted with 30 milliliters of an aqueous solution containing 5% by weight of sodium carbonate having an adjusted pH of about 11.2. The extraction process was repeated seven more times. The pH of the sodium-carbonate extract was then adjusted to 6.2 with hydrochloric acid, to yield an anabolic substance-containing precipitate. The precipitate and the aqueous sodium carbonate extract were then each in turn extracted with 75 milliliters of ethyl ether. This procedure was repeated three more times to yield a light yellow ethereal solution, which was then evaporated to yield 116 milligrams of solid anabolic substance. This material was then subjected to multiple transfer countercurrent distribution using 100 tubes and a solvent system consisting of two parts chloroform and two parts carbon tetrachloride as the lower phase and four parts methanol and one part water as the upper phase, all parts by volume. The solid material obtained from the multiple transfer countercurrent distribution was F.E.S.

The following examples illustrate the reduction of F.E.S. to dihydro F.E.S. alcohol.

EXAMPLE IV

Dihydro F.E.S. alcohol was produced by dissolving 0.5 gram F.E.S. in 200 milliliters of ethanol and reducing this 3 hours at 30° C. and 100 p.s.i. of hydrogen using 2 grams of Raney nickel as catalyst. After filtering and concentrating, the dihydro F.E.S. alcohol product was crystallized and melted, after being washed with 2 to 3 milliliters of 2-nitropropane, at 143°–160° C.

EXAMPLE V

The reduction of F.E.S. was carried out at 30° C. for 5 hours at 1,000 p.s.i. hydrogen pressure in methanol using Raney nickel catalyst to provide dihydro F.E.S. alcohol melting, after several crystallizations from 2-nitropropane and nitromethane, at 141°–143° C. and analyzing:

| | Calc. ($C_{18}H_{26}O_5$ | Found |
|---|---|---|
| Percent C | 67.1 | 67.2 |
| Percent H | 8.14 | 8.28 |

The production of F.E.S. alcohol, i.e. the selective reduction of the ketone group is illustrated by the following example.

EXAMPLE VI

To a mixture of 50 milliliters methanol and 0.3 gram F.E.S. was added slowly and with cooling 1 gram of sodium borohydride. The mixture was heated for 2 hours on a steam bath and the methane was evaporated. The residue was neutralized with HCl and extracted with two 40 milliliter portions of ether. The ether was evaporated and the residue dissolved in 10 milliliters of isopropyl alcohol. After addition of 5 milliliters water and partial evaporation, the F.E.S. alcohol hydrate product, 0.21 gram having a melting point of 91°–106° C. was recrystallized and the melting point was reduced to 90°–102° C. It had the following analysis:

| | Calculated | Found |
|---|---|---|
| Percent C | 63.88 | 62.93 |
| Percent H | 7.74 | 7.71 |

Trimethyl F.E.S. alcohol (i.e. A is —CH=CH— and each R and $R_2$ is methyl) and trimethyldihydro F.E.S. alcohol i.e. A is —$CH_2$—$CH_2$— and each R and $R_2$ is methyl) are prepared according to the following example.

EXAMPLE VII

A

To 10 milliliters of water is added 0.5 gram of F.E.S. alcohol prepared according to Example VI and 2 grams of sodium hydroxide. The resulting mixture is stirred and an excess of dimethyl sulfate is added. The mixture is stirred and filtered to remove the precipitate which is trimethyl F.E.S. alcohol.

B

Trimethyldihydro F.E.S. alcohol is prepared according to the procedure of Example VIIA by substituting dihydro F.E.S. alcohol for F.E.S. alcohol.

The production of triacetyl F.E.S. alcohol (i.e. A is —CH=CH—, each R is acetyl and $R_2$ is

wherein $R_1$ is methyl) and triacetyldihydro F.E.S. alcohol (i.e. A is —CH$_2$—CH$_2$—, each R is acetyl and $R_2$ is

wherein $R_1$ is methyl) is illustrated by the following example.

EXAMPLE VIII

A

To a solution of 368 milligrams dihydro F.E.S. alcohol in 8 milliliters pyridine is added an excess of acetic anhydride and the mixture is left at room temperature for 16 hours. Twenty-five milliliters of water are then added and the mixture stored in a refrigerator for several hours. The solid precipitate, triacetyl dihydro F.E.S. alcohol, is recovered by filtration, washed with water, vacuum dried and recrystallized from methanol.

B

Triacetyl F.E.S. alcohol is produced by the procedure of Example VIIIA substituting F.E.S. alcohol for dihydro F.E.S. alcohol.

The following example illustrates the production of monomethyl and dimethyl dihydro F.E.S. alcohol derivatives where $R_2$ is

wherein $R_1$ is methyl, the monomethyldihydro F.E.S. alcohol derivative having a methyl group which replaced the hydrogen of the hydroxyl group on the benzene ring ortho to the ester group in the formula and the other R is

wherein $R_1$ is methyl, and the dimethyldihydro F.E.S. alcohol derivative being one where R is methyl.

EXAMPLE IX

Dimethyl sulfate (5 milliliters) was added to a solution of 2.24 grams F.E.S. in 80 milliliters of a 10% NaOH solution and 20 milliliters of water. The mixture was stirred for one-half hour at 18°–20° C. (cooling bath) and an additional 5 milliliters of dimethyl sulfate was added. After an additional 70 minutes of stirring at 20°–26° C., the solid precipitate, Solid A, was collected by filtration, washed with water and dried. The filtrate from Solid A was acidified with 25 milliliters of 12 N $H_2SO_4$ to yield a second precipitate, Solid B, which was collected, washed with water and dried.

Solid A (0.79 gram having a melting point of 114°–118° C.) was recrystallized from a mixture of 10 milliliters water and 15 milliliters ethanol to yield 0.66 gram of dimethyl F.E.S. having a melting point of 108°–110° C.

Solid B (1.39 grams having a melting point of 152°–162° C.) was recrystallized twice from a mixture of water and alcohol to yield 0.8 gram of monomethyl F.E.S. product having a melting point of 169°–174° C., with the methyl group replacing the hydrogen in the hydroxyl group in the position ortho to the ester group. Analysis of Solid B showed:

|  | Calc. ($C_{19}H_{24}O_5$) | Found |
| --- | --- | --- |
| Percent C | 68.65 | 67.97 |
| Percent H | 7.28 | 7.16 |
| Percent OMe | 9.34 | 9.28 |

The olefinic bond and ketone group of each of the dimethyl and monomethyl F.E.S. so produced are reduced according to the procedure of Example IV.

Acylation of dimethyldihydro F.E.S. alcohol and monomethyldihydro F.E.S. alcohol to produce, respectively, dimethylmonoacetyldihydro F.E.S. alcohol (i.e. A is —CH$_2$—CH$_2$—; R is methyl and $R_2$ is

wherein $R_1$ is methyl) and monomethyldiacetyldihydro F.E.S. alcohol having the formula:

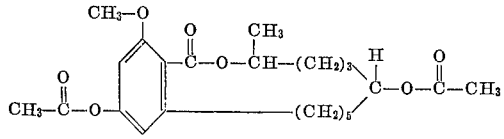

is accomplished according to the acylation procedure of Example VIII.

EXAMPLE X

The selective reduction of the ketone group of each of dimethyl F.E.S. and monomethyl F.E.S. according to the procedure of Example VI produces the corresponding F.E.S. alcohols the hydroxyl groups of which are acylated according to the procedure of Example VIII.

The production of monomethyldiacetyl F.E.S. alcohol having the methyl group replacing the hydrogen in the hydroxyl group on the benzene ring para to the ester group in the general formula is illustrated by the following example.

EXAMPLE XI

Nitrosomethylurea in an amount of 1.2 grams was slowly added to a cold mixture of 3.6 milliliters of 50% potassium hydroxide and 17 milliliters of ether. After a few minutes the yellow ether layer of the mixture was decanted, dried over potassium hydroxide, and then added to a solution of 0.3 gram of F.E.S. in 17 milliliters of ether. The resulting yellow mixture was left overnight in a loosely stoppered flask and then ether and diazomethane were evaporated using a steam bath. The remaining gummy residue was crystallized by adding 3 milliliters of water, heating to 60° C., and adding ethanol almost to solution. On cooling, crystals formed, yielding 0.137 gram of product having a melting point of 111°–116° C. which was recrystallized in the same way to yield 0.082 gram of monomethyl F.E.S. having a melting point of 120°–122° C. and analyzing:

|  | Calc. ($C_{19}H_{24}O_5$) | Found |
| --- | --- | --- |
| Percent C | 68.7 | 68.3 |
| Percent H | 7.28 | 7.38 |
| Percent $OCH_3$ | 9.34 | 9.17 |

The monomethyl F.E.S. is selectively reduced to the alcohol following the procedure of Example VI and then acylated according to the procedure of Example VIII to produce a compound having the formula:

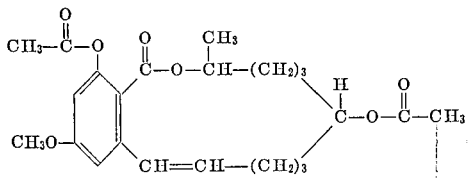

EXAMPLE XII

Six head of cattle are fed a daily ration including a mixture of alfalfa hay and ground corn cobs containing from 1 to 20 ounces of the monomethyldiacetyl F.E.S. compound of Example XI per hundred pounds of ration.

It is claimed:

1.

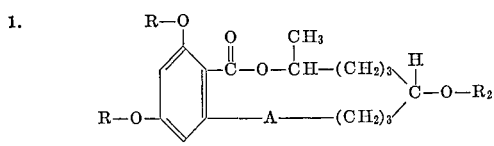

wherein R is selected from the group consisting of hydrogen, lower alkyl and the radical

$R_1$ is lower alkyl, $R_2$ is selected from the group consisting of lower alkyl and

and A is a radical selected from the group consisting of —CH=CH— and —$CH_2$—$CH_2$—.

2. An animal feed comprising a nutritional diulent and growth promoting amounts of the compound of claim 1.

3. The compound of claim 1 wherein each R and $R_2$ are methyl and A is the radical —CH=CH—.

4. The compound of claim 1 wherein each R and $R_2$ are methyl and A is the radical —$CH_2$—$CH_2$—.

5. The compound of claim 1 wherein A is the radical —CH=CH— and each R and $R_2$ are acetyl.

6. The compound of claim 1 wherein A is the radical —$CH_2$—$CH_2$— and each R and $R_2$ are acetyl.

7. The compound of claim 1 wherein A is the radical —$CH_2$—$CH_2$—, each R is methyl and $R_2$ is acetyl.

8. The compound of claim 1 wherein A is the radical —$CH_2$—$CH_2$—, the R ortho to the ester group is methyl and the other R and $R_2$ are acetyl.

9. The compound of claim 1 wherein A is the radical —CH=CH—, each R is methyl and $R_2$ is acetyl.

10. The compound of claim 1 wherein A is the radical —CH=CH—, the R ortho to the ester group is methyl and the other R and $R_2$ are acetyl.

11. The compound of claim 1 wherein A is the radical —CH=CH—, the R para to the ester group is methyl and the other R and $R_2$ are acetyl.

12. An animal feed comprising a nutritional diluent and growth promoting amounts of the compound of claim 3.

13. An animal feed comprising a nutritional diluent and growth promoting amounts of the compound of claim 4.

14. An animal feed comprising a nutritional diluent and growth promoting amounts of the compound of claim 5.

15. An animal feed comprising a nutritional diluent and growth promoting amounts of the compound of claim 6.

16. An animal feed comprising a nutritional diluent and growth promoting amounts of the compound of claim 7.

17. An animal feed comprising a nutritional diluent and growth promoting amounts of the compound of claim 8.

18. An animal feed comprising a nutritional diluent and growth promoting amounts of the compound of claim 9.

19. An animal feed comprising a nutritional diluent and growth promoting amounts of the compound of claim 10.

20. An animal feed comprising a nutritional diluent and growth promoting amounts of the compound of claim 11.

References Cited by the Examiner

UNITED STATES PATENTS 2,842,051  8/1958  Brian et al. _____ 99—2

OTHER REFERENCES

Stob et al.: Nature, vol. 196, page 1318, December 29, 1962.

A. LOUIS MONACELL, *Primary Examiner.*